Dec. 14, 1948.                G. G. SOMERVILLE                2,456,457
                      ELECTROMAGNETIC INDUCTION APPARATUS
                            AND METHOD OF FORMING SAME
Filed May 22, 1944                                      8 Sheets-Sheet 1

Inventor:
Gareth G. Somerville,
by Harry E. Dunham
His Attorney.

Dec. 14, 1948.　　　G. G. SOMERVILLE　　　2,456,457
ELECTROMAGNETIC INDUCTION APPARATUS
AND METHOD OF FORMING SAME
Filed May 22, 1944　　　　　　　　　　　　　8 Sheets-Sheet 3

Inventor:
Gareth G. Somerville,
by Harry E. Dunham
His Attorney.

Dec. 14, 1948.  G. G. SOMERVILLE  2,456,457
ELECTROMAGNETIC INDUCTION APPARATUS
AND METHOD OF FORMING SAME
Filed May 22, 1944  8 Sheets-Sheet 7

Inventor:
Gareth G. Somerville,
by Harry E. Dunham
His Attorney.

Dec. 14, 1948.  G. G. SOMERVILLE  2,456,457
ELECTROMAGNETIC INDUCTION APPARATUS
AND METHOD OF FORMING SAME
Filed May 22, 1944  8 Sheets-Sheet 8

Inventor:
Gareth G. Somerville,
by Tracy E. Dunham
His Attorney.

Patented Dec. 14, 1948

2,456,457

UNITED STATES PATENT OFFICE 2,456,457

ELECTROMAGNETIC INDUCTION APPARATUS AND METHOD OF FORMING SAME

Gareth G. Somerville, Pittsfield, Mass., assignor to General Electric Company, a corporation of New York Application May 22, 1944, Serial No. 536,748

16 Claims. (Cl. 175—356)

My invention relates to magnetic cores of the curved iron type for electromagnetic induction apparatus, to the apparatus employing such cores, and to a method of forming the core and producing the assembled magnetic core and winding.

Heretofore, it has been customary to form electromagnetic induction apparatus such as transformers and reactors with cores of two general types: one being of the flat laminated type, each layer including a plurality of assembled laminations or punchings; and the second being of the bent or wound type in which the magnetic strip forming the core is flatwise bent to provide a plurality of nestled layers of magnetic strip material. There is, however, a third type including powdered iron bonded together which has particular application to high frequency apparatus. Although it has been known since the latter part of the last century that cores may be made of the flatwise bent type, for instance as shown in British Patent 7856 of 1889, it has been customary for many years to form the cores of electromagnetic induction apparatus by assembling a plurality of flat punchings or laminations to provide a closed core. These laminations have been formed of various shapes, such as I-shaped punchings which are overlapped at the four corners, and punchings have been formed in the shape of L's, two L-shaped punchings being assembled to provide each layer of a closed magnetic core.

However, after highly directional strip steel became available to transformer design engineers several years ago, cores produced of a plurality of layers of assembled punchings formed of this material which are overlapped at the corners will have higher losses in the corner areas where the flux must traverse crosswise of the most favorable magnetic direction.

Attempts to overcome this difficulty in flat laminated core structures have included the idea of punching the laminations with diagonal shaped ends and then welding the laminations together so as to produce a flux path at the corners in line with the most favorable magnetic direction, such a method being described and claimed in Patent 1,783,063, Vienneau, issued November 25, 1930, and assigned to the same assignee as this present invention. An arrangement of providing an overlapped mitered joint at the corners so that only a minimum of flux need pass crosswise of the most favorable magnetic direction is described and claimed in Patent 2,348,003, Granfield, issued May 2, 1944, and assigned to the same assignee as this present invention.

In order to assemble the bent or wound core with a preformed conductive winding structure it is necessary that the magnetic strip material should not be bent beyond its elastic limit in order to provide an economical core, since bending or straining the magnetic strip material beyond a predetermined amount will greatly increase its losses. A very efficient electromagnetic induction apparatus having a wound core is described and claimed in Patent 2,160,588, Granfield, issued May 30, 1939, and which is assigned to the same assignee as this present invention. The Granfield method includes the steps of spirally winding a magnetic strip on a form to the shape that the core will have when in the finished apparatus and then annealing in that position. The core is then unwound and simultaneously rewound on a preformed conductive winding structure so that each turn in the finished core will have the same shape and the same position relative to the other turns as it had after the anneal. The Granfield core produces a circular type core, and in Vienneau Patents 2,305,649 and 2,305,650, issued December 22, 1942, there is described and claimed an apparatus and method of forming the apparatus which includes a spirally wound core which can be applied to a conductive winding structure of an elongated or rectangular cross section. The Vienneau method can be employed with a continuous magnetic strip or by cutting the strip every couple of turns as it is wrapped or threaded through the winding window.

Since both the Granfield and Vienneau methods require the threading of the annealed magnetic strip through the conductive winding window without flexing the strip beyond its elastic limit, such methods have been more economically applied in the smaller type of transformers such as distribution transformers in which the strip is of suitable size so that it may be conveniently handled.

It is therefore an object of my invention to provide an efficient method of forming a curved iron type magnetic core which may be assembled with a conductive winding structure, which method is simple and will produce an efficient electromagnetic induction apparatus for either circular or non-circular core structures and for a relatively wide range of apparatus sizes.

It is a further object of my invention to provide an electromagnetic induction apparatus with an improved core of the curved iron type.

A further object of my invention is to provide an improved method of producing as assembled magnetic core of the curved iron type and a conductive winding of the preformed type for an electromagnetic induction apparatus.

Further objects and advantages of my invention will become apparent from the following description referring to the accompanying drawing, and the features of novelty which characterize my invention will be pointed out with particularity in the claims annexed to and forming a part of this specification.

Referring to the drawings.

In the drawings I have illustrated my invention as applied to transformers but it will be understood that my improved core and method of assembling with a conductive winding may be applied to any other suitable type of electromagnetic induction apparatus, such as a reactor.

Figures 1, 2:
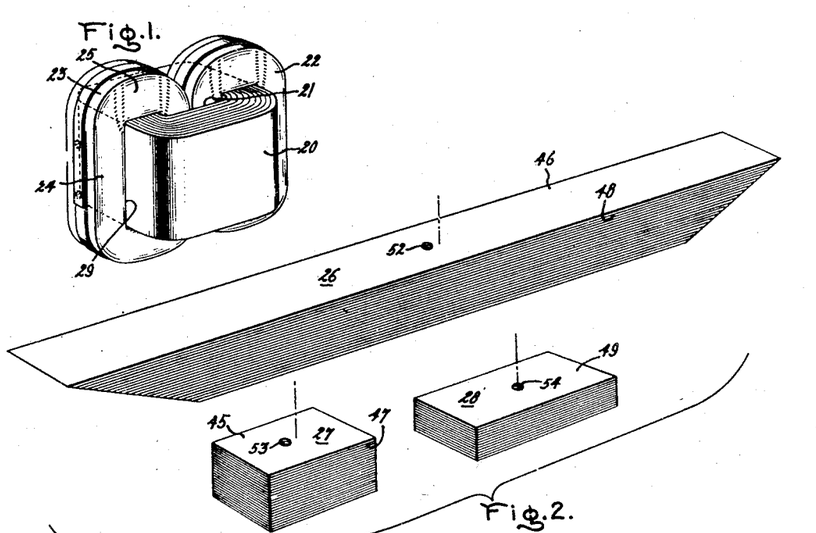
Fig. 1 illustrates an electromagnetic induction apparatus, such as a transformer including a winding and curved iron type cores which are formed according to my invention.
Fig. 2 is a perspective view of stacks of the three different groups of magnetic sheets which are employed to produce the curved iron type cores of Fig. 1.

Referring to Fig. 1 of the drawing, I have illustrated a transformer including a winding 20 which has a noncircular or oblong winding window 21. Passing through approximately one half the winding window 21 and surrounding one of the legs of the winding 20 I provide a magnetic core 22. In Fig. 1 a similar core 23 is shown filling the other half of the winding window and surrounding another leg of the winding. It is to be understood, however, that either one or any suitable number of my improved curved iron type magnetic cores may be employed.

When assembling a core with a preformed type winding it is necessary, as has been pointed out above, that the magnetic strip should not be flexed beyond its elastic limit or otherwise its magnetic characteristics will be substantially impaired. As shown in the drawings, and described below, I provide a method of assembling a curved iron type core with a preformed coil winding to produce an efficient structure which not only does not cause flexure of the magnetic strip beyond its elastic limit but at least a portion of the magnetic core is assembled through the window of the preformed coil without either flexing or relatively moving the closely nestled magnetic sheets of that portion.

In the transformer illustrated in Fig. 1, each of the cores 22 and 23 includes a U-shaped portion 24 and a removable yoke portion 25. The portion 24 of the magnetic core is formed of a group of magnetic sheets indicated generally by the numeral 26 in Fig. 2, while the removable yoke portion includes a group of magnetic sheets indicated generally by the numeral 27 in Fig. 2. The yoke portion in Fig. 1 also includes a number of filler strips of the group indicated generally by the numeral 28, but it will be apparent as the description proceeds that the filler strips 28 may, if desired, be omitted.

Although features of my improved method as described below of forming a curved iron type core may be employed to produce a core with a joint positioned in any suitable part of the core, it will be seen in the particular construction illustrated in Fig. 1 that the adjacent ends of the various sheets at one end of the core portion 24 are in general alignment with the inner surface 29 of the winding leg, while the other ends of the laminations forming the core portion 24 are in general alignment with the other inner edge of the winding leg. Thus the core portion 24 is in the form of a U with ends in the same general planes as the inner and outer surfaces of the winding leg so that the gap between the opposite ends of the sheets making up the portion 24 is at least approximately as big as the thickness of the leg of the winding 20 which is surrounded by the core 23. With such a construction the U-shaped portion may be assembled with the winding without flexing the sheets or moving them relative to each other. The particular joint construction will be described in further detail below and in relation to Fig. 10.

In order to produce a group of punchings or sheets 26 to form the core portion 24 in which the sheets will have the relative lengths as is shown in Fig. 1, the various sheets which form the group 26 are provided so that the sheets which are at the inner periphery of the finished core have a predetermined length and with the sheets becoming progressively longer toward the outer periphery. Thus knowing the inner and outer peripheral distances of the core and the thickness of the core, it may be determined relatively accurately just how long the sheets should be in order to produce the desired joint construction, and the sheets may be measured out and cut by hand or they may be cut on a suitable index shearing machine such as the type illustrated in Fig. 27, and which machine will be described below after the description of my improved core and apparatus construction.

Figure 3:
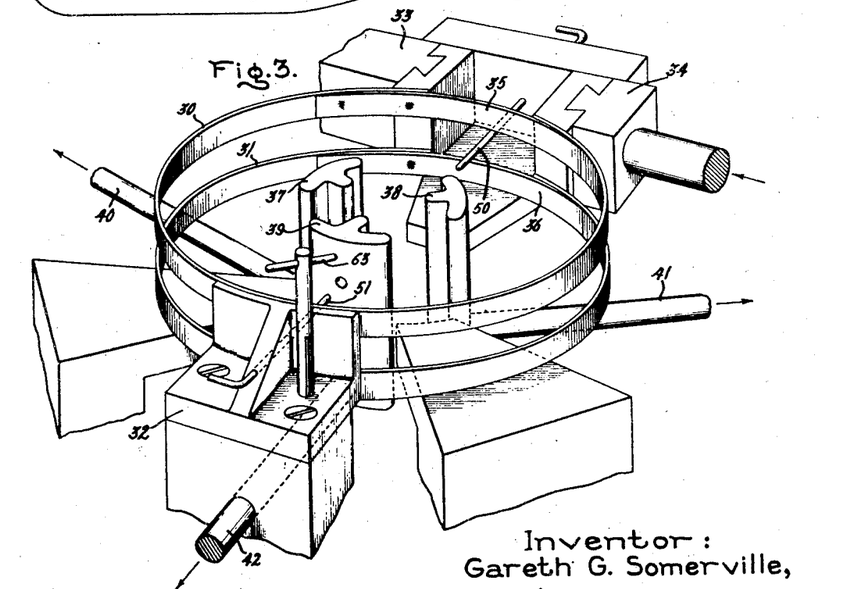
Fig. 3 is a perspective view of an apparatus which may be employed in the process of producing a core of the type illustrated in Fig. 1.

The various groups of sheets illustrated in Fig. 2 may be assembled in any suitable manner to produce my improved core, and I have illustrated in Fig. 3 a convenient machine on which the sheets may be assembled for carrying out a step of my improved method. Referring to Fig. 3, the machine includes a band construction 30 and 31 which is in the shape of a ring, the bands being supported on one side of the ring by a relatively stationary support construction 32. The rings 30 and 31 are provided with ends which are attached to a block construction 33 and other ends which are attached to a relatively movable block construction 34. The remainder of the space between the ends supported by the blocks 33 and 34 is made up by ring segments 35 and 36 which overlap the ends of the rings 30 and 31. Relatively movable bars 37, 38, and 39 are provided which have curved faces to cooperate with the sheets when they are inserted into the stacking machine of Fig. 3, as will be described below. It will be seen that the fingers 37, 38, and 39 are attached to rods 40, 41, and 42, respectively, which are movable radially and when moved outwardly, as shown by the arrows, pressure is applied to the assembled sheets so as to relatively tightly pack or nestle them together. The blocks 33 and 34, it will be seen, are relatively movable so that the periphery of the rings 30 and 31 may be contracted in order to relatively tightly force the adjacent ends of the sheets of each layer together, which will also be described in more detail below.

Figure 4:
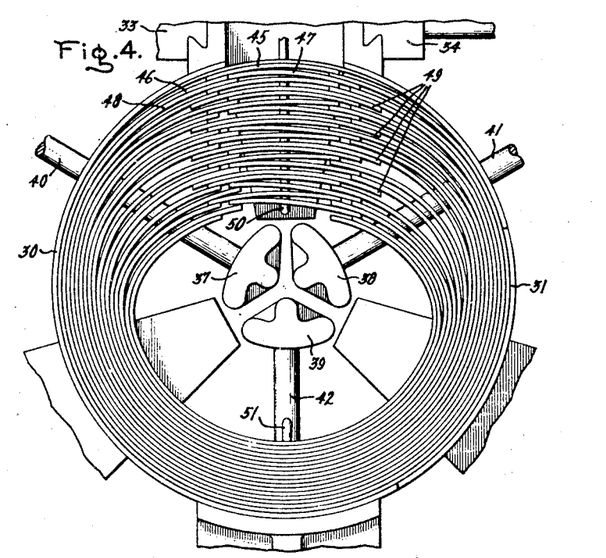
Figs. 4, 5, and 6 illustrate three different steps of a process of assembling the sheets of the three groups shown in Fig. 2 into a toroidal or ring-shaped core structure.
Figure 5:
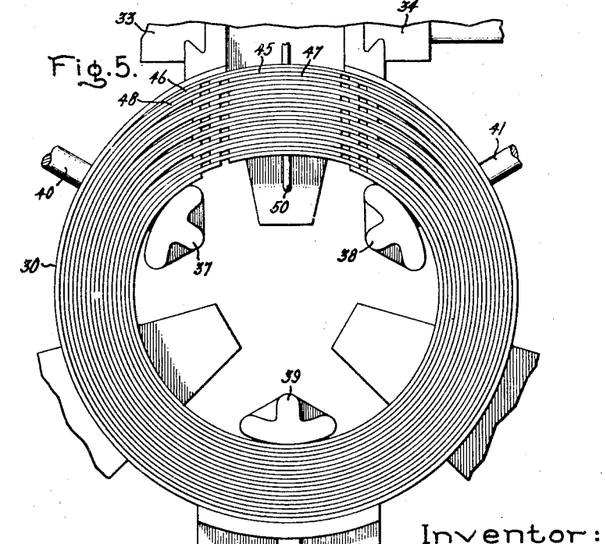
Figures 6, 7, 8, 9:
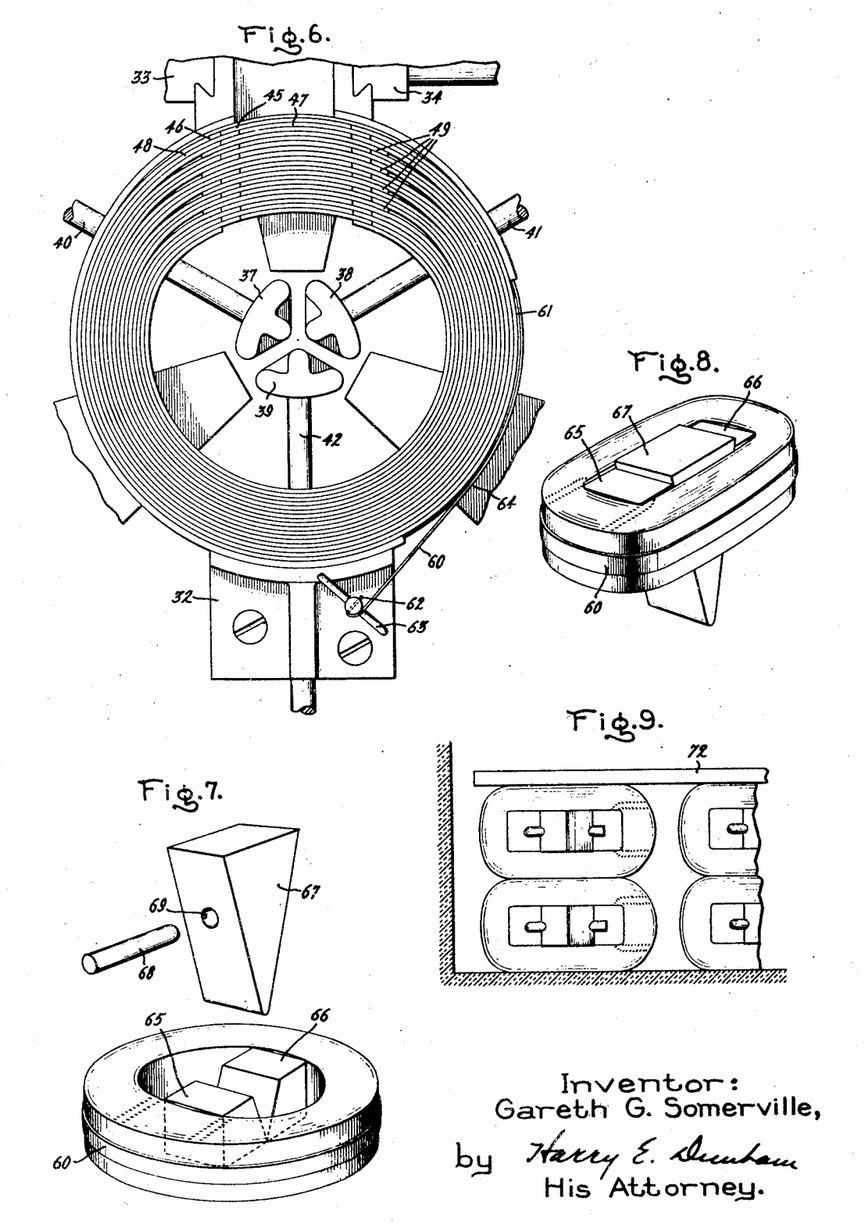
Fig. 7 is an exploded perspective view of the toroidal shaped core surrounding an expanding type mandrel.
Fig. 8 illustrates the core construction of Fig. 7 after it has been expanded into an elongated or rectangular cross section.
Fig. 9 illustrates somewhat diagrammatically a plurality of core structures stacked in an oven to obtain a strain-relief anneal.

Referring to Figs. 4, 5, and 6, the sheets from the various groups, as is illustrated in Fig. 2, may be assembled inside the rings 30 and 31 in any suitable manner so that the ends of adjacent sheets of two of the groups will be in abutting relation and so that the two groups form a closed magnetic core. Thus, one sheet from the larger group 26 and one sheet from the smaller group 27 are of sufficient size so as to make one complete layer around the periphery of the core, although they may have any other suitable length. In the step of my improved method illustrated in Fig. 4, one of the sheets, such as that indicated by the numeral 45 from the smaller group 27 of Fig. 2, is introduced inside the rings 30 and 31 and then the longer sheet indicated by the numeral 46 from the group 26 is introduced into the inside of the ring so that after the core assumes the shape it will have in the finished apparatus the adjacent ends of the sheets 45 and 46 will be in abutting relation, which is shown in Fig. 6. For convenience in assembling, the sheet 46 is not sprung sufficiently by hand when first inserted to have its ends butt with those of 45. This, however, is done by expanding the fingers 37, 38, 39 when any suitable number of sheets have been assembled, but it is to be understood that each sheet may be separately expanded if desired.

In order to continue the assembling of the sheets of the two groups, a second sheet 47 from the group 27 may be introduced in that same general portion of the rings which is occupied by the sheet 45, and the next sheet 48 from the group 26 is placed adjacent the sheet 46. After any suitable number of sheets have been introduced in the manner described above, a filler sheet 49 may be introduced from group 28 of Fig. 2, and the purpose of this filler sheet 49 will become apparent as the description proceeds.

In order to facilitate the holding of the various sheets inside the rings 30 and 31, pins 50 and 51 are provided and openings or holes are provided in the various sheets through which the pins may extend. Thus the pins 50 and 51 extend in diametrically opposite sides of the stacking rings 30 and 31, and the pin 51 is so provided as to extend through all openings 52 which are provided in the sheets of the group 26. Also openings 53 and 54 are provided in the groups 27 and 28 through which extend the pin 50, the openings being shown in Fig. 2.

After any suitable number of sheets from the various groups have been inserted in the stacking rings 30 and 31, force may be applied to the three fingers 37, 38, and 39, so as to cause the assembled laminations to be pushed outwardly and to extend to a periphery slightly larger than the finished periphery of the final core so that all the adjacent ends of the various sheets will drop into proper position. This position is shown in Fig. 5 with the adjacent ends of the sheets of the two groups being spaced slightly apart. Force may then be applied to the block 34 by holding the block 33 stationary so as to contract the periphery by drawing the ends of the rings 30 and 31 closer together until adjacent ends of the sheets of each layer are placed in abutting relation, as is illustrated in Fig. 6.

Figure 10:
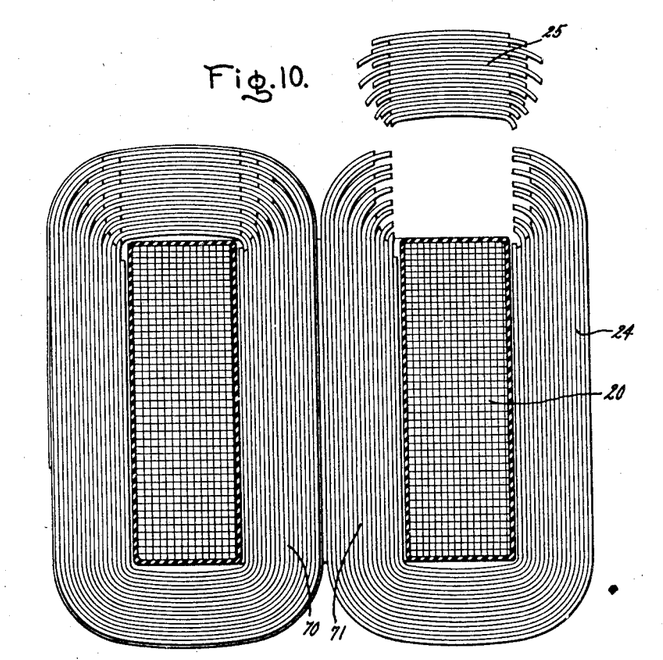
Fig. 10 is a sectional side elevation of the transformer construction of Fig. 1 with one of the curved iron type cores assembled on one of the legs of the winding and with a second core in the process of being assembled through the winding window and around the other leg of the winding.
Figure 27:
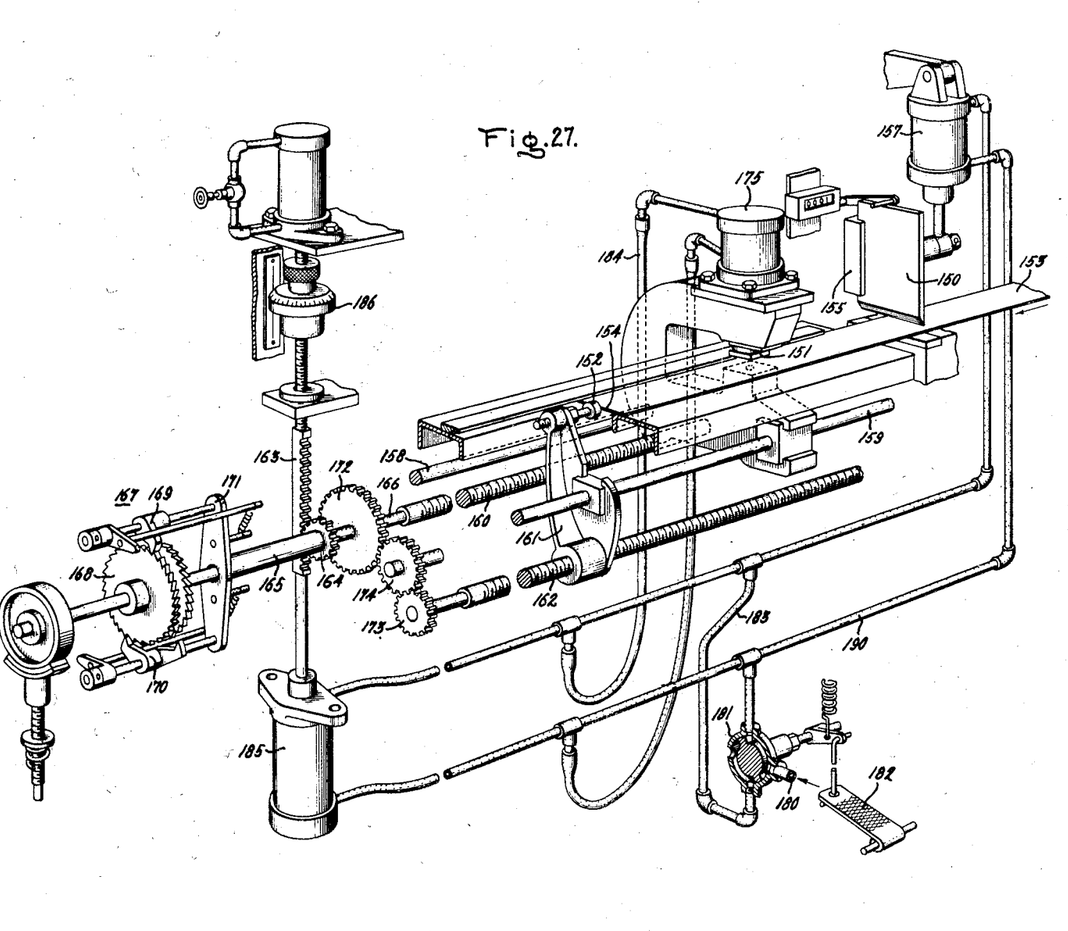
Fig. 27 is a perspective view of an index shearing machine which may be employed to produce the groups of magnetic strips illustrated in Fig. 2.

It will be seen that the finished core, as shown in Fig. 6 and also as shown in Figs. 1 and 10, has a butt lapped joint construction so that the adjacent joints of contiguous layers will not be in registry. In order to provide a convenient arrangement for producing the overlapped butt joint, the holes in the groups of sheets 26 and 27 are placed slightly off the longitudinal center of each sheet, as is shown in Fig. 2, the amount of offset determining the amount of overlap of adjacent ends. Then when assembling the sheets, the adjacent sheets of each group are reversed so that the longer portions of the sheet extending from the off center hole will project first in one direction and then in the opposite direction from the pin 51. The holes 52 and 53 may be introduced at any suitable time, and I have found it convenient to punch the hole at the same time the sheet is cut on the machine, as is illustrated in Fig. 27.

Referring again to Fig. 4, the overlap joint is obtained in the following manner: The first sheet 45 is introduced by passing the pin through the opening 53 and having the longer side of the sheet 45 extend in either direction, such as extending it toward the left of the pin 50 as is shown in Fig. 4. It will be apparent that the sheet 46 is then applied with the pin 51 passing through its opening 52 with its short side extending to the left of the pin 51 so that the adjacent ends of the sheets 45 and 46 will be placed in abutting relation when they assume the position as is illustrated in Fig. 6. The joints between the sheets 45 and 46, referring to Fig. 6, will then be displaced to the left by an amount equal to the offset of the openings 52 and 53 from the longitudinal center line of the respective sheets. In order that the butt joint between the adjacent ends of the sheets 47 and 48 will be offset from the right of the pin 50 these sheets will be placed over the pins 50 and 51, respectively, with the longer ends of the sheets extending in the opposite direction from the adjacent sheets 45 and 46, or the right and left of the pins respectively.

It will be understood that when the various sheets 45, 46, 47, 48 are assembled as described above, any suitable number of sheets may, of course, be employed. Thus, one sheet from each group may be assembled at a time, or any suitable number may be assembled, and I have found it convenient when using 14 mill strip to assemble the various sheets of each group by two's so that there will in fact be two joints in registry and which joints are offset from the adjacent joints.

By providing a construction with a staggered butt joint or a butt lap joint, a more efficient construction is produced than if the holes were put in the longitudinal center of each of the sheets so that the holes will all come in registry. However, such a construction may, of course, be provided according to my improved method if desired, such a construction being illustrated in Figs. 16 to 18.

In order to provide a continuous path for the flux which will bridge across both sets of joints at suitable places in the core, it will be seen that the filler strips 49 are provided. The filler strips 49, of course, increase the cross section of the yoke portion or removable portion 25 as compared with the remaining portion 24 of the core by an amount equal to the total width of the filler sheets 49. Thus in the construction illustrated in Fig. 6, where four filler strips are employed of 10 mil, the removable yoke portion 25 will be 40 mils thicker than the remainder of the core or core portion 24. It is to be understood, of course, that the filler strip 49 may be omitted if desired. Since the ends of the filler strips 49 are not in abutting relation with other strips, the openings 54 may be placed in the center of the strips.

After the sheets have been assembled, as is illustrated in Fig. 6, in order to produce an elongated core construction the assembled sheets are removed from the assembled machine of Fig. 3 and expanded in any suitable manner. In order to insure that the sheets upon removal will be maintained in an assembled condition, a band 60 of suitable material such as metal may be placed around the assembled sheets so as to hold them together. This band may be put around the assembled sheets in any suitable manner, and in Fig. 6 it will be seen that the band 60 has been wrapped around the assembled sheets in the space between the spaced rings 30 and 31. One end 61 of the band may be placed so that there will be an overlap so that when the end 62 is attached to the rotatable fixture 63 the band may be pulled relatively tightly around the assembled sheets. The band may then be welded together as is illustrated by the numeral 64, after which the end 62 may be removed from the fixture 63 and the excess of the band cut off.

The core may be expanded in any suitable manner such as by means of the expandable form shown in Fig. 7 which includes two blocks 65 and 66 with tapered surfaces. Upon introduction of a wedge 67 between the tapered surfaces 65 and 66 the assembled sheets may be forced into the shape as is illustrated in Fig. 8. The pin 68 is then inserted through the hole 69 in the wedge 67 so as to hold the expandable form in the position as is illustrated in Fig. 8. It will be understood that the expandable form is of such size and shape that after expanding, the core construction, as is shown in Fig. 8, will have a shape similar to the shape it is to have in the finished core, as is illustrated in Fig. 1.

In order to give the sheets a permanent set in the position and relationship they are to have in the finished core, and also so as to remove all deleterious strains, the core in the configuration, as illustrated in Fig. 8, is given a strain relief anneal. This may be accomplished in any suitable manner, such as by stacking a plurality of cores in an oven, as is diagrammatically illustrated in Fig. 9, and heating to any suitable temperature, such as 980 degrees C. for a sufficient time to give the desired anneal. Upon removal of the cores from the oven they will have a permanent set, and strain due to the expanding and bending of the sheets will have been removed. The core is now in condition to be assembled with the preformed coil.

In order to assemble the core upon removal from the oven with the preformed coil winding, for instance as is illustrated in Fig. 1, the bridging yoke is removed leaving a U-shaped portion which may be inserted into the window of the preformed winding. Referring to Fig. 10 it will be seen that on the right-hand side of the figure there is shown a core with the band 60 removed, the yoke 25 having also been removed and the U-shaped core portion 24 having been inserted into the coil winding window. The yoke 25 may be removed in any suitable manner such as by applying pressure to the removable yoke in a direction substantially in the plane of the sheets. Any suitable number of the removable sheets which make up the groups 27 and 28 may be removed at one time. Thus pressure may be applied to force out all the removable yoke sheets at one time or a few may be forced out at once. It will be understood that upon removal of the yoke sheets, care should be taken in stacking them up in the order in which they are removed so that they can be returned, after the core portion 24 has been inserted into the coil winding, to the position that each yoke sheet had previous to its removal. Thus I have found it convenient to remove about 10 or 12 yoke sheets at a time when using 14 mil strip starting with the outside sheet and stacking them up so that upon all the yoke sheets being removed, the inner yoke sheet will be on the top of the stack. The sheets may then be reassembled in any suitable number such as by holding all the sheets in proper alignment and introducing together, or by taking a few sheets each time such as 4 or 5, beginning with the smaller or innermost sheet and reinserting in their proper position. When all the yoke sheets 25 have been introduced the core sheets will assume the positions they had after removal from the strain-relief anneal and surround the windings in the position as is illustrated by the left-hand core illustrated in Fig. 10.

I have found that an electromagnetic induction apparatus such as a transformer formed as described above produces an apparatus with a very efficient core construction, and furthermore with a very high space factor. By high space factor is meant a maximum amount of iron is obtained within the winding window, and it will be understood that the more iron that can be placed within a given winding window the smaller the surrounding winding and complete apparatus need be for a predetermined kv.-a. Referring to Fig. 10 it will be seen that the winding legs 70 and 71 of the two cores are relatively tightly positioned within the winding window with only sufficient space between the two legs to allow the leg 71 to be introduced after the leg 70 has been assembled around the winding. Furthermore, since the U-shaped portions 24 of the cores are not disturbed after removal from the strained-relief anneal, the legs 70 and 71 will be relatively dense. This will be particularly apparent when referring to Fig. 9, when it will be seen that these legs are placed one on top of the other and a weight 72 is placed over all the cores. Thus during the strain-relief anneal which is hot enough to soften the steel but not hot enough to cause it to flow, the contiguous laminations in the winding legs will be forced relatively tightly against each other and due to my improved structure and method of assembly, the sheets which make up the winding legs 70 and 71 are not in any way disturbed or moved relative to each other during assembly with the coil winding structure. Of course, they could be slightly flexed, if necessary or desirable.

In order to illustrate the efficiency of an electrical induction apparatus formed according to my invention I am giving below in the following table the exciting current in ampere turns per inch and core loss in watts per pound at various leg densities from 10 to 120 kilolines per square inch:

| Density | Exciting Current A. T. Per Inch | Core Loss, Watts Per Pound |
|---|---|---|
| 10 | 0.191 | 0.0113 |
| 20 | 0.303 | 0.0407 |
| 30 | 0.406 | 0.0857 |
| 40 | 0.465 | 0.146 |
| 50 | 0.615 | 0.220 |
| 60 | 0.754 | 0.3095 |
| 70 | 0.945 | 0.415 |
| 80 | 1.222 | 0.545 |
| 90 | 1.73 | 0.700 |
| 100 | 2.99 | 0.917 |
| 110 | 7.08 | 1.261 |
| 120 | 22.15 | 1.972 |

In Figs. 1 and 10 I have described my invention as applied to a single winding with a rectangular shaped window, but it is to be understood that my invention may be employed with any suitable type of conductive winding structure and its corresponding core structure.

Referring to Figs. 11 through 15 I have illustrated other types of electromagnetic induction apparatus constructions to which my improved core construction finds efficient application, but it is to be understood that these are only by way of example and are not limiting as to the types to which my invention may be employed.

Figure 11:
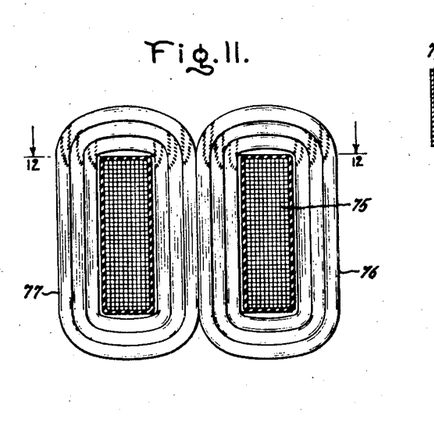
Figs. 11 and 12 illustrate my invention as applied to a cruciform core construction.
Figure 12:
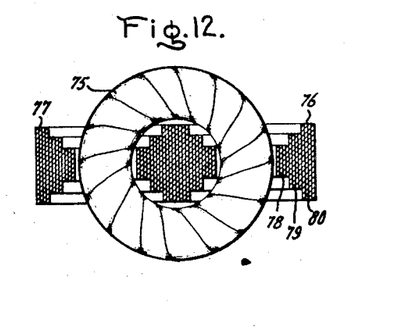

In Figs. 11 and 12 I have illustrated a construction including a core for filling the tubular shaped window within the preformed coil winding 75, there being shown two similar cores 76 and 77 each of which is made up of three separate core portions having three different widths. Thus the inner section 78 is assembled around the core first and then the core section 79 which has a wider width of magnetic sheet material is assembled second. A final core section 80 is provided which has a width of magnetic sheet which is only slightly smaller than the diameter of the winding window. The core sections may also be assembled as a unit. It will be understood that the core 77 has similar sections so as to provide a cruciform core which fills the circular winding window to a greater extent than would a rectangular shaped core construction. It will be understood that each of the cores is formed in the manner described above.

Figure 13:
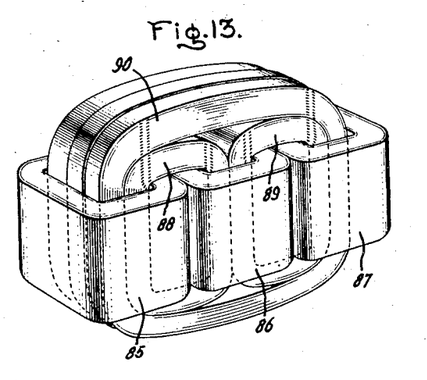
Fig. 13 is a perspective view of a three-phase transformer employing three cores formed according to my invention.

In Fig. 13 there is illustrated a perspective view of an electromagnetic induction apparatus having three separate core sections linking three windings, and this construction has particular application to a three phase transformer, and the application of a wound or a curved iron type core to this particular configuration of cores is described and claimed in Evans Patent 2,344,294, issued March 14, 1944, and assigned to the same assignee as this present invention. It will be seen that the construction includes three conductive winding structures 85, 86, and 87 with a core structure 88 linking the windows of the windings 85 and 86 and a core section 89 passing through the winding windows of the windings 86 and 87. A third core 90 surrounds the cores 88 and 89 and passes through the winding windows of the windings 85 and 87. It will be understood that the cores shown in Fig. 13 are also formed in the manner described above.

Figure 14:
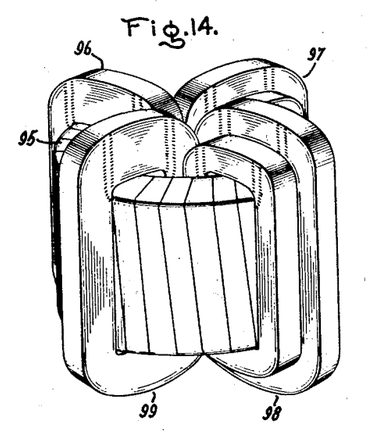
Figs. 14 and 15 illustrate a transformer having a circular winding window and four cores of a stepped construction.
Figure 15:
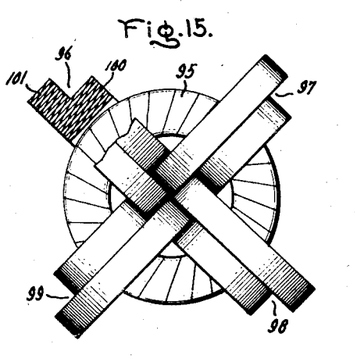

Figs. 14 and 15 illustrate another method of filling a circular or tubular shaped winding window with four different cores, each core having two different widths. The idea of providing a stepped core construction with a wound core type is described and claimed in Patent 2,333,464 issued November 2, 1943 to Christensen and assigned to the same assignee as this present invention.

As will be seen from Figs. 14 and 15, a winding 95 having a tubular shaped window is linked by four different cores 96, 97, 98, and 99. As each of the cores is similar, only one will be described. The core 96 is formed by a core portion 100 having a certain width and built up to a predetermined amount depending upon the size of the coil window. A section 101 is then provided around the section 100 of magnetic sheets which have a width approximately half the width of the sheets 100. Four of these cores may be assembled with a winding by assembling a core portion 100 and then surrounding it with the narrower core portion 101, as will be seen in Fig. 15. The edge of the core portion 101 will lie relatively closely adjacent the outer laminations of the extending portion of the wider core portion 100.

Figure 16:
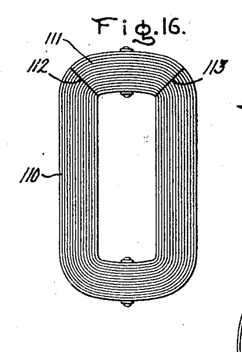
Figs. 16, 17, and 18 illustrate my invention as applied to a core having a butt joint.
Figure 17:
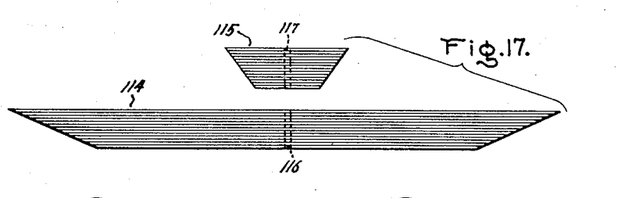
Figure 18:
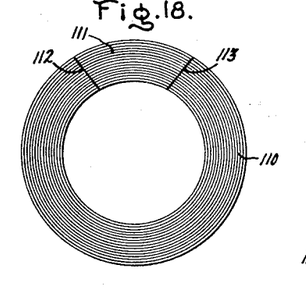

Referring to Fig. 16 I have illustrated a core construction similar to that which is shown in Fig. 1 except a butt joint is provided between the two core portions instead of an overlap joint, as is described above in connection with Figs. 1 to 10. Thus the core includes a U-shaped portion 110 and a removable yoke portion 111 with butt joints at 112 and 113. It will be understood that the core portions 110 and 111 are formed from sheets of two groups in the same manner as described above in connection with Fig. 2. Thus the U-shaped core portion 110 is formed from a group of laminations having a shape as shown by the group marked 114 in Fig. 17 while the removable yoke is formed of a group of sheets marked 115 in Fig. 17. It will be noted that the groups 114 and 115 have openings 116 and 117 which are in the longitudinal center of the sheets so that when they are stacked in the same manner described above in relation to Figs. 3 through 6 the joints between adjacent sheets of each group will be formed in registry, as is shown in Fig. 18. The core may then be expanded to produce a core having the construction as shown in Fig. 16, or the core if desired may be used in the circular formation as shown in Fig. 18. It will be understood that the core construction shown in Figs. 16 and 18 unless very accurately made will have a somewhat higher core loss and exciting current than the core having the overlap joint as shown in Fig. 1.

Figure 19:
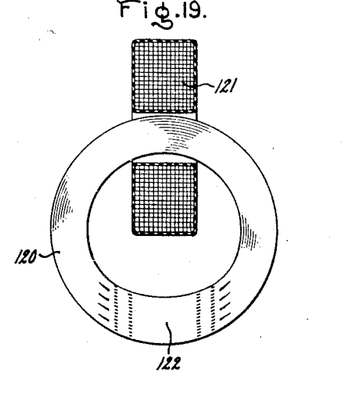
Fig. 19 illustrates a core formed according to my invention assembled with the winding, the core having a circular construction instead of being expanded into an oblong shape.

In Fig. 19 I have illustrated an electromagnetic induction apparatus having a core 120 assembled with a conductive winding 121. The core 120 is similar to that shown in Fig. 6, and is used without the expansion step as is employed to produce the core of Fig. 1. The core is assembled with a preformed coil by removing the removable yoke piece 122, assembling through the window of the coil 121 and then reassembling the yoke pieces 122 in the manner described above.

Figure 20:
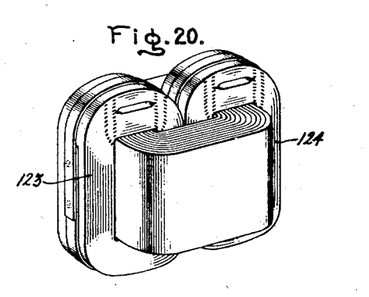
Fig. 20 illustrates a transformer of the type illustrated in Fig. 1 having a modified joint construction.
Figure 21:
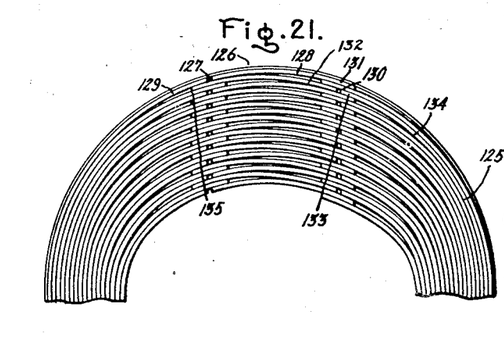
Fig. 21 illustrates in further detail the joint construction of the core illustrated in Fig. 20 before it is expanded.

Referring to Fig. 20 I have illustrated a transformer having cores formed in the manner described above in relation to Figs. 1 to 10 except the various sheets have been cut so as to produce a butt overlap joint as is shown in Fig. 21. As each of the cores 123 and 124 is similar only one will be described. Referring to Fig. 21 the core is formed by assembling sheets from two groups similar to the groups 26 and 27 of Fig. 2. In the construction of Fig. 21, however, the two groups of sheets employed to produce this core are so cut that the corresponding sheets of each group which make up one complete layer have a total length slightly larger than the total peripheral distance of the finished core in that particular layer. This produces an overbuild of the core in the removable yoke portion. Thus the core 123 of Fig. 20 is formed of one core portion 125 and a removable yoke portion 126. The core is assembled by abutting one end 127 of a removable yoke sheet 128 with an adjacent end of the sheet 129 taken from the larger group of laminations similar to the group 26 of Fig. 2. The sheet 129, however, is sufficiently long that the opposite end thereof 130 will overlap with the adjacent end 131 of the sheet 128. Similarly a yoke sheet 132 is provided with a butt joint with an adjacent end 133 of a sheet 134 from the longer group of laminations. Hereagain the sheet 134 is sufficiently long so that its opposite end 135 will overlap with the adjacent end of the yoke sheet 132. This particular overlap butt joint which produces a build of approximately one and a half times the thickness of the remainder of the core is described in further detail and claimed in my patent application Serial No. 553,523, filed September 11, 1944 and assigned to the assignee of the application.

Figure 22:
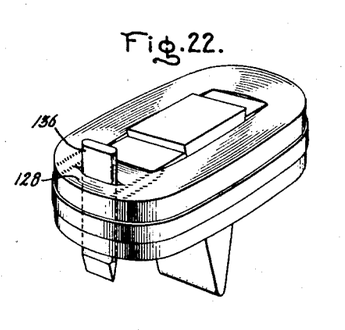
Fig. 22 illustrates the core of Fig. 21 after it has been expanded.
Figure 23:
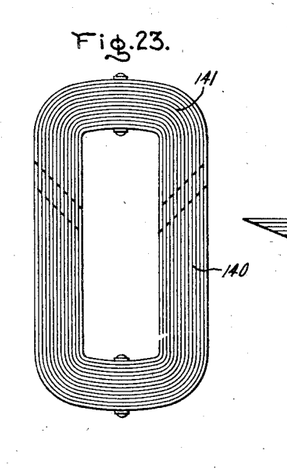
Figs. 23 to 26 illustrate features of my invention as applied to a further modified core construction.
Figure 24:
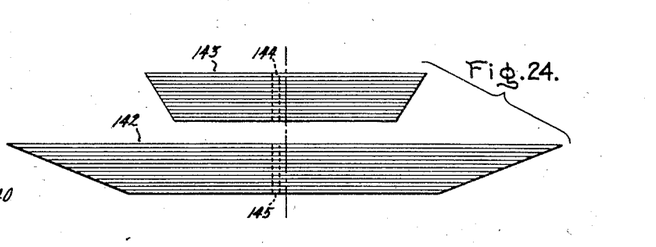
Figure 25:
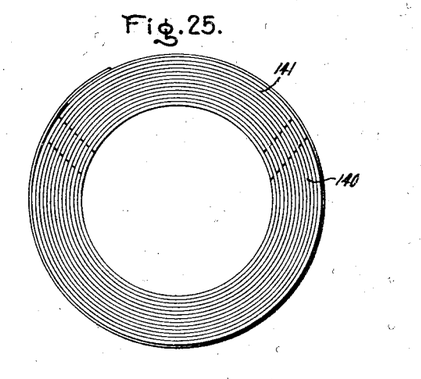

After the sheets have been assembled as shown above in connection with Fig. 21, the core may be used in this shape after anneal or it may be expanded as shown in Fig. 22. In view of the overbuild in the yoke portion 128 it will be understood that this portion is spongy and if desired an opening may be placed in the spongy part to receive fractional turns of a winding by the use of a wedge 136 which is driven within the yoke. After the core has been annealed in the shape illustrated in Fig. 22 the expanded form and the wedge 136 may be removed.

Figure 26:
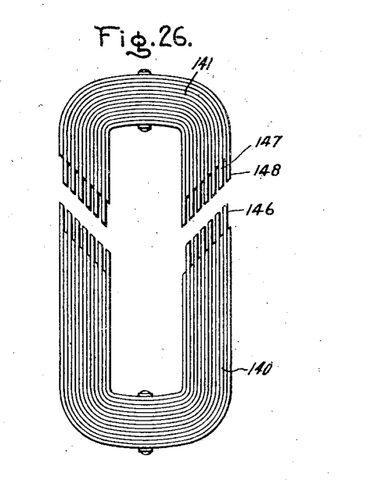

In the construction described above the cores each take the general shape of a U-shaped portion and a removable yoke portion, but it is to be understood that features of my invention may be used to form a core with a joint in any other suitable place around the periphery, and in Figs. 23 to 26 I have shown a core with an overlap butt joint which is produced in the core winding legs. The core 23 includes two U-shaped portions 140 and 141, the portion 140 being formed of a group of sheets indicated by the numeral 142 of Fig. 24, and the U-shaped portion 141 being formed of a group of sheets 143. As will be seen in Fig. 24 an overlapping is provided by having openings 144 and 145 in the group of laminations which openings are offset from the longitudinal center line. Thus when the sheets are assembled in the manner described above in connection with Figs. 3 to 6, corresponding sheets of each group to produce each layer will be in abutting relation but adjacent sheets of layers will have offset joints. It will be understood that this overlapping is produced by reversing the sheets of the two groups in the same manner described above in connection with Figs. 3 to 6. The core may then be expanded to a rectangular shape and then annealed in this position. The U-shaped portions may then be pulled apart by applying force in opposite directions to both the U's so that the U's may be pulled apart, as shown in Fig. 26. It will be understood that the two U's may then have adjacent legs assembled in a winding window by pushing one of the U's into the other in a direction parallel with the longitudinal axis of the core or perpendicular to the plane of the sheets. Thus in the construction illustrated in Figs. 23 to 26, since the sheets are so cut as to produce the joints in the winding legs the portion 141 must be assembled with the portion 140 by inserting in a direction in line with the longitudinal axis of the core instead of perpendicular thereto as is used in the method of assembling the removable yoke 25 with the U-shaped portion 24 as is illustrated in Fig. 10.

Figure 28:
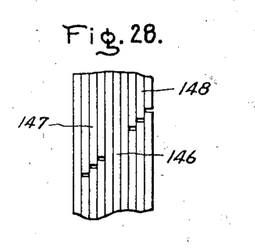
Fig. 28 is an enlarged view of about three of the layers of sheets of Fig. 23 in the vicinity of the joint.

In order to have the various ends of the U-shaped portions 140 and 141 sufficiently stiff so that they may be properly assembled, a plurality of sheets will ordinarily be used to produce each of the layers of the core, although one sheet of suitable thickness may be used in each layer, if desired. Thus, for example a layer 146 of the core portion 140 may be formed of three sheets of ten mil strip. It will be understood that if only one sheet of 10 mil strip were employed, the end of the layer 146 would not be as stiff as when three sheets are used so that it would take more time to fit the end of the layer 146 into the slot between the ends 147 and 148 of the adjacent layers of the core portion 141. It will be understood, however, that any suitable number of sheets may be employed in each layer so that the projecting ends will be sufficiently stiff so that they will fit together in the proper position. In Fig. 28 I have enlarged three adjacent layers to show the stepped joint construction when three sheets are used to form each layer.

In order to produce the groups of magnetic sheets which are used to form the core construction described above, which sheets are illustrated in Fig. 2, cutting from suitable magnetic strip such as that type having highly directional properties in a longitudinal direction may be accomplished in any suitable manner. Thus, as was mentioned above in connection with Fig. 2, by taking the size of the window of the conductive winding structure the designer can calculate, knowing the average width of the magnetic strip that is to be employed, the number of layers which will go into the composition of the core, and he can determine the length of each sheet depending upon where he wants the joint to fall. Thus two groups of punchings may be formed so as to produce a butt joint in the two legs as is illustrated in Fig. 16, and it will be appreciated that in producing a butt joint that a relatively accurate butt joint will have to be formed in order to obtain low core losses. In my applications S. N. 538,303, filed June 1, 1944, I have described a method of forming a core so as to produce a relatively accurate butt joint without going to the trouble of grinding, as grinding will produce short circuiting burrs which must be removed by a suitable treating operation as has been known in the transformer and motor art for some time.

It will therefore be seen that any suitable type of straight or scarfed butt or overlapped joint may be produced by merely cutting the various groups of laminations to the desired size, and in Fig. 27 I have illustrated what I call an index shearing machine upon which sheets may be cut in progressively different lengths and with an opening placed in the sheet offset a suitable amount from the longitudinal center line of the sheet. The index shearing machine described in Fig. 27 forms the subject matter of my application S. N. 539,255, filed June 8, 1944, now patent No. 2,369,617, and assigned to the same assignee as this present invention, and reference may be had to that application for a more complete description of the operation thereof. However, I shall briefly describe below this operation in producing a group of progressively different lengths of laminations, such as of the type illustrated in Fig. 2 by the group number 26. The index shearing and cutting machine includes a cutter 150, a punch mechanism 151, and a stop 152. It is to be understood that any suitable number of cutters and punches may be used. Thus when a strip 153 is introduced onto the machine from a suitable roll, not shown, with an end 154 adjacent the stop 152, upon operation of the shearing knife 150 and the punch 151 a length of sheet will be formed with a hole suitably positioned therein. The knife 150 is vertically movable in a block 155 but is stationary with respect to any horizontal movement. A piston operated member 157 is provided for operating the knife 150 either downwardly or upwardly when desired. Since the various sheets are going to be cut in progressively different lengths and with a hole offset the same distance from the center line of each of the sheets, it will be understood that both the punch 151 and the stop 152 must move horizontally with respect to each other and also with respect to the relatively stationary shear supporting block 155. The supporting member of the punch 151 is supported through two bars 158 and 159. In order to move the punch support 151 in a longitudinal or horizontal direction, I provide a screw or threaded bar member 160.

In order to suitably support and operate the stop 152, I provide a stop supporting arm 161 which is also supported on the bar 159 and is movable in a longitudinal or horizontal direction through a screw 162. It will therefore be seen that by suitably rotating screws 160 and 162 that the punch 151 and stop 152 may be moved in a horizontal direction.

In order to provide an arrangement for rotating the screw bars 160 and 162, I provide a rack 163 which meshes with a pinion 164 which is solidly attached to a sleeve 165. The sleeve 165 is freely and rotatably supported on an extension 166 of the screw 160. Thus the sleeve 165 is free to rotate on the rod 166 and is operatively connected thereto by means of a ratchet mechanism indicated generally by the numeral 167. A tooth wheel 168 is supported by the rod 166 and cooperates with a pair of dogs 169 and 170 which are in turn carried by an arm 171 which is supported on the sleeve 165. Movement of the rod 166 due to vertical movement of the rack 163 will cause the screw 160 to rotate and thus move the punch 151. It will also be seen that the screws 160 and 162 are connected to two tooth wheels 172 and 173 which are operatively connected together through a pinion 174. Since the wheel 172 has twice the diameter of the wheel 173 there will be a two to one ratio between the two and thus the stop 152 will move twice as fast or twice the distance as the punch 151. It is to be understood that this ratio may be any suitable amount. In this manner the holes 52 in the groups 26 will each be punched offset the same amount from the longitudinal center line of each of the sheets. In order to operate the shearing knife piston 157, the punch operating piston 175, and the rack 163, I provide an air system including a source 180 which communicates through a valve 181 to a plurality of pipes. Thus upon the operator pushing the operating foot pedal 182 air will be admitted through the pipes 183 to the top of the piston 157 thus causing the shear to move downwardly. Also, air will be admitted to the top of the piston 175 through the flexible hose connection 184, causing the punch also to move downwardly. In like manner air will be admitted to the top of an operating piston 185 which is connected to the rack 163, thus causing the rack to move downwardly. The amount by which the rack moves downwardly may be controlled by means of the micrometer adjustment 186. It will be seen that downward movement of the rack 163 will cause the dogs 169 and 170 to freely turn around on top of the tooth wheel 168.

In order to retract the shear and punch, the operator removes his foot from the pedal 182 thus causing air to be admitted to the pipe 190, and it will be seen that this will cause air to be introduced into the bottom of the pistons 157, 175, and 185, thus retracting the shear and punch and causing the rack to move upwardly which causes the tooth wheel 168 to move due to operative connection between the dog 169 and the tooth wheel 168. It will be understood that this will cause movement of the screws 160 and 162 thus resetting them suitably for the next cutting operation.

It will be understood that instead of cutting each sheet a different length in the manner described above in connection with Fig. 27, in order to produce a group of sheets such as shown in Fig. 2, a large number of sheets of one length could be cut in order to produce a large number of cores and successively cutting a similar number of sheets of the desired width. In this manner so called mass production could be obtained of the sheets of each of the widths. However, since magnetic strips usually come from the mill marked a certain thickness, such as 10 mils or 14 mils, a large roll which contains several thousand feet may vary one or two thousands of a mil throughout the strip. Thus if a large number of sheets were made all the same length in order to make a number of cores, the various sheets might be of different thickness thus throwing off the designer's calculation of the peripheral dimension of each layer, and likewise the joint would not be as desired. However, by progressively cutting each sheet a different length any irregularities in the thickness will be taken up in each of the sheets rather than all in one sheet of one length.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States, is—

1. A closed curved iron type magnetic core including two groups of flatwise assembled magnetic sheets formed of magnetic strip material having the most favorable magnetic direction lengthwise of said strip, each of said groups forming a portion of the closed core, said sheets of at least one of said groups being flatwise curved forming a substantially strain-free core portion and providing continuous magnetic paths at corners, said second group of sheets being assembled with ends thereof in abutting relation with ends of said sheets of said first group so that flux passes between the abutting ends, said sheets of said first group being formed with a hole slightly displaced longitudinally from the center of said sheets, said sheets being assembled with the holes thereof in alignment and adjacent sheets being assembled longitudinally reversed from each other so as to provide overlapping ends and thereby stagger said butt joints.

2. A closed magnetic core including two groups of flatwise assembled magnetic sheets formed of magnetic strip material having the most favorable magnetic direction lengthwise of said strip, each of said groups forming a portion of the closed core, said sheets of at least one of said groups being flatwise curved forming a substantially strain-free core portion and providing continuous magnetic paths at corners, said groups being assembled with ends of adjacent sheets of said groups in abutting relation so that flux passes between the abutting ends, said sheets of said first group from the inner perimeter to the outer perimeter being formed of lengths having progressively increasing lengths and at least some of adjacent assembled sheets being peripherally displaced from each other so as to provide overlapping ends and thereby stagger said butt joints, one of said groups having filler sheets being slightly longer than the remaining sheets in said group so as to provide a magnetic path from one butt joint to the other.

3. A closed curved iron type magnetic core including two groups of flatwise assembled magnetic sheets formed of magnetic strip material having the most favorable magnetic direction lengthwise of said strip, each of said groups forming a portion of the closed core, said sheets of at least one of said groups being flatwise curved forming a substantially strain-free core portion and providing continuous magnetic paths at corners, said second group of sheets being assembled with ends thereof in abutting relation with ends of said sheets of said first group so that flux passes between the abutting ends, said sheets of said groups being provided with holes displaced longitudinally from the center of said sheets, said sheets being assembled so that the holes of each of said sheets of said groups are respectively in alignment and adjacent sheets of each group being assembled longitudinally reversed from said respective adjacent sheet so as to provide overlapping ends and thereby stagger said butt joints.

4. A closed magnetic core including two groups of flatwise assembled magnetic sheets formed of magnetic strip material having the most favorable magnetic direction lengthwise of said strip, each of said groups forming a portion of the closed core, said sheets of at least one of said groups being flatwise curved forming a substantially strain-free core portion and providing continuous magnetic paths at corners, said groups being assembled with ends of adjacent sheets of said groups in abutting relation so that flux passes between the abutting ends, said sheets of one of said groups from the inner perimeter to the outer perimeter being formed of lengths having progressively increasing lengths, and said sheets being provided with holes displaced longitudinally from the center of said sheets, said sheets being assembled with the holes thereof in alignment and adjacent sheets being assembled longitudinally reversed from each other so as to provide overlapping ends and thereby stagger said butt joints.

5. The method of forming and assembling an electromagnetic induction apparatus having curved iron type core and a preformed coil which includes the steps of cutting from magnetic strip material in commercial form at least two groups of sheets each having a length less than the total length of the perimeter of the finished core, assembling the sheets from both groups and curving the sheets flatwise so as to form a plurality of assembled laminations to form a closed core, expanding the core by mechanical force into the shape it will have when assembled with the coil winding, annealing the core to substantially remove strains due to curving the magnetic sheets, removing from the core the sheets which form one of the groups, assembling the other group with the coil, and replacing the first group in substantially the same position as it had before removal.

6. The method of producing an assembled magnetic core and winding for an electromagnetic induction apparatus including the steps in providing at least one group of sheets of magnetic material with holes in the sheets displaced from the longitudinal axes of the sheets, assembling a plurality of sheets including sheets from said group to form a closed core of a plurality of layers and with each layer comprising at least two sheets with butt joints between adjacent ends of the sheets, aligning the holes of contiguous sheets and longitudinally reversing some of the sheets from others so as to stagger some of the butt joints, giving the core the shape it will have in the finished apparatus and annealing in that position, disassembling the core sheets into two groups of relatively tightly nestled sheets without substantially bending the sheets, and reassembling the two groups around the winding without substantially bending the sheets into the position each sheet had before disassembly and after the anneal.

7. The method of producing an assembled magnetic core and winding for an electromagnetic induction apparatus including the steps of providing two groups of sheets of magnetic material, assembling the sheets from both groups to provide a closed magnetic core of a plurality of layers with each layer including one sheet from each group, and with the sheets of each group being assembled respectively contiguously, applying pressure at both the inside and outside surfaces of the assembled core structure so as to abut relatively closely adjacent ends of the sheets of layers and to provide a relatively tight laminated structure with the shape the core will have in the finished apparatus, annealing the core in this position, disassembling the groups of sheets into two core portions without substantially bending or causing relative movement of contiguous sheets of one group, and reassembling the two core portions around the winding without substantially bending the sheets into the postion they had before disassembly and after the anneal.

8. The method of producing an assembled magnetic core and winding for an electromagnetic induction apparatus including the steps providing two groups of sheets of magnetic material, curving flatwise the sheets of at least one of the groups and assembling the sheets from both groups to provide a closed magnetic core of a plurality of layers with each layer including one sheet from each group and with the layers of each group being assembled respectively contiguously, applying pressure at both the inside and outside surfaces of the assembled core structure so as to abut relatively closely adjacent ends of sheets of layers and to provide a relatively tight laminated structure with the shape the core will have in the finished apparatus, annealing the core in this position, disassembling the groups of sheets into two core portions without substantially bending or causing relative movement of contiguous sheets of one group, and reassembling the two core portions around the winding without substantially bending the sheets into the position they had before disassembly and after anneal.

9. The method of producing an assembled magnetic core and winding for an electromagnetic induction apparatus including the steps providing two groups of sheets of magnetic material, curving flatwise the sheets of at least one of the groups and assembling the sheets from both groups within the inner surface of a ring shaped member to provide a closed magnetic core of a plurality of layers with each layer including one sheet from each group and with the layers of each group being assembled respectively contiguously, applying pressure at both the inside and outside surfaces of the assembled core structure so as to abut relatively closely adjacent ends of sheets of each layer and to provide a relatively tight laminated structure with the shape the core will have in the finished apparatus, annealing the core in this position, disassembling the groups of the sheets into two core portions without substantially bending or causing relative movement of contiguous sheets of one group, and reassembling the two core portions around the winding without substantially bending the sheets into the position they had before disassembly and after anneal.

10. The method of producing an assembled magnetic core and winding for an electromagnetic induction apparatus including the stpes of providing two groups of sheets of magnetic material, assembling the sheets from both groups to provide a closed magnetic core of a plurality of layers with each layer including one sheet from each group, and with the sheets of each group being assembled respectively contiguously, applying pressure at both the inside and outside surfaces of the assembled core structure so as to abut relatively closely adjacent ends of the sheets of each layer and to provide a relatively tight laminated structure with the shape the core will have in the finished apparatus, annealing the core in this position, sliding out the sheets of one group by applying pressure in a direction parallel to the plane of the sheets, assembling the sheets of the other group with the winding as a group without substantially bending or causing relative movement of contiguous layers, and returning the removed sheets to substantially the position each had before disassembly by sliding the sheets in the direction of the plane of the assembled sheets.

11. The method of producing an assembled magnetic core and winding for an electromagnetic induction apparatus including the steps of cutting from magnetic strip material at least two groups of sheets each having a length less than the total length of the perimeter of the finished core and with the lengths of the sheets of at least one of the groups having progressively different lengths, assembling the sheets from both groups within the inner surface of a ring shaped member beginning with the longer sheets and using progressively the smaller sheets to provide a closed magnetic core of a plurality of layers with each layer including one sheet from each group and with the sheets of each being assembled respectively contiguously, giving the core the final shape it will have in the finished apparatus, annealing in that position, disassembling the groups of sheets into two core portions and assembling around the winding so that the sheets occupy the same relative position they had before disassembly without causing deleterious strains in the core.

12. The method of producing an assembled magnetic core and winding for an electromagnetic induction apparatus including the steps of cutting from magnetic strip material at least two groups of sheets each having a length less than the total length of the perimeter of the finished core and with the lengths of the sheets of each group having progressively different lengths, assembling the sheets of both groups to provide a closed core of a plurality of layers and providing the longer sheets of each group at the outer periphery with each layer including one sheet from each group and with the sheets of each group being assembled alternately and respectively contiguously, applying pressure at both the inside and outside surfaces of the assembled core structure so as to abut relatively closely adjacent ends of the sheets of each layer and to provide a relatively tight laminated structure with the shape the core will have in the finished apparatus, annealing the core, and disassembling the groups of sheets into two core portions and reassembling the two core portions around the winding.

13. The method of forming a core for an electromagnetic induction apparatus including the steps of providing a plurality of sheets of magnetic material with holes in the sheets displaced from the longitudinal centers of the sheets, and assembling the sheets to provide a magnetic core by aligning holes of contiguous sheets and longitudinally reversing some of the sheets from adjacent sheets so as to stagger the ends of the adjacent sheets.

14. The method of forming a curved iron type core including the steps of providing two groups of about a similar number of magnetic sheets with at least one of the groups with sheets of progressively different lengths and with the sum of the lengths of corresponding sheets of each group equal to the total perimeter of the assembled core at a predetermined layer, flatwise bending and assembling the groups of sheets to form two core portions with ends of corresponding sheets of the two groups in abutting relation to provide a closed magnetic core and applying pressure to both the inside and outside surfaces of the closed magnetic core so as to suitably align the corresponding sheets of each core portion so that ends of the corresponding sheets will abut relatively tightly together to provide a low loss magnetic joint, and annealing the core portions.

15. The method of forming a curved iron type core including the steps of providing two groups of about a similar number of magnetic sheets with at least one of the groups with sheets of progressively different lengths and with the sum of the lengths of corresponding sheets of each group equal to the total perimeter of the assembled core at a predetermined layer, flatwise bending and assembling the groups of sheets to form two core portions with ends of corresponding sheets of the two groups in abutting relation to provide a closed magnetic core, and applying pressure in at least two directions to the core so as to suitably align the corresponding sheets of each core portion so that ends of the corresponding sheets will abut relatively tightly together to provide a low loss magnetic joint, and annealing the core portions.

16. A laminated magnetic core having a core joint which is composed of adjacent joints in its respective lamination layers, said adjacent joints being staggered butt joints, and magnetic filler strips between certain layers which bridge the staggered butt joints in those layers.

GARETH G. SOMERVILLE.

REFERENCES CITED

The following references are of record in the file of this patent:

UNITED STATES PATENTS

| Number | Name | Date |
| --- | --- | --- |
| 523,572 | Hassler | July 24, 1894 |
| 1,102,513 | Johannesen | July 7, 1914 |
| 1,457,619 | Cohen | June 5, 1923 |
| 1,606,761 | Guilband | Nov. 16, 1926 |
| 1,933,140 | Gakle | Oct. 31, 1933 |
| 1,935,426 | Acly | Nov. 14, 1933 |
| 2,058,362 | Smalley | Oct. 20, 1936 |
| 2,252,461 | Franz | Aug. 12, 1941 |
| 2,288,855 | Steinmayer | July 7, 1942 |
| 2,293,951 | Seastone et al. | Aug. 25, 1942 |
| 2,313,306 | Wiegand | Mar. 9, 1943 |
| 2,344,006 | Steinmayer | Mar. 14, 1944 |
| 2,344,294 | Evans | Mar. 14, 1944 |
| 2,344,337 | Winestock | Mar. 14, 1944 |
| 2,372,074 | Ford | Mar. 20, 1945 |

FOREIGN PATENTS

| Number | Country | Date |
| --- | --- | --- |
| 7,856 | Great Britain | 1889 |
| 106,986 | Great Britain | June 14, 1917 |
| 515,873 | Great Britain | Dec. 15, 1939 |